(12) United States Patent
Rao et al.

(10) Patent No.: US 8,950,179 B2
(45) Date of Patent: Feb. 10, 2015

(54) ENGINE EXHAUST AFTERTREATMENT COMPONENT INCLUDING AFTERTREATMENT BRICK MODULE

(71) Applicant: Caterpillar Inc., Peoria, IL (US)

(72) Inventors: Pradyumna Venkata Rao, Peoria, IL (US); Saad Hasan, Wheaton, IL (US); Ian Aguirre, Peoria, IL (US); Varun Malik, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/692,135

(22) Filed: Dec. 3, 2012

(65) Prior Publication Data
US 2014/0154159 A1 Jun. 5, 2014

(51) Int. Cl.
| | | |
|---|---|---|
| *F01N 3/00* | (2006.01) | |
| *F01N 3/02* | (2006.01) | |
| *F01N 3/10* | (2006.01) | |
| *F01N 3/20* | (2006.01) | |
| *F01N 3/28* | (2006.01) | |
| *F01N 13/00* | (2010.01) | |

(52) U.S. Cl.
CPC ............ *F01N 3/2066* (2013.01); *F01N 3/2875* (2013.01); *F01N 13/0097* (2013.01); *F01N 13/0093* (2013.01); *F01N 2450/30* (2013.01); *F01N 2590/02* (2013.01)
USPC ................. 60/324; 60/299; 60/323; 181/270; 181/243; 422/177; 55/502

(58) Field of Classification Search
USPC ................... 60/299, 323, 324; 181/270, 243; 422/177; 55/502
See application file for complete search history.

(56) References Cited

U.S. PATENT DOCUMENTS

| | | | |
|---|---|---|---|
| 4,756,383 A * | 7/1988 | Sterrett ........................ | 181/243 |
| 5,089,938 A | 2/1992 | White et al. | |
| 5,169,604 A * | 12/1992 | Crothers, Jr. .................. | 422/177 |
| 5,709,415 A * | 1/1998 | Witter ........................... | 285/304 |
| 6,544,210 B1 * | 4/2003 | Trudel et al. ..................... | 604/26 |
| 6,895,747 B2 | 5/2005 | Upadhyay et al. | |
| 7,157,060 B1 * | 1/2007 | Newburry ..................... | 422/177 |
| 7,160,519 B1 * | 1/2007 | Norby et al. .................. | 422/168 |
| 7,192,463 B2 | 3/2007 | Shutty et al. | |
| 7,517,380 B2 | 4/2009 | Grimm et al. | |
| 7,550,024 B2 | 6/2009 | Pawson et al. | |
| 7,814,747 B2 | 10/2010 | Bandl-Konrad et al. | |
| 2007/0251201 A1 * | 11/2007 | Miller ............................ | 55/502 |
| 2008/0066446 A1 * | 3/2008 | Sangiovani ..................... | 60/274 |
| 2011/0146253 A1 | 6/2011 | Isada et al. | |
| 2012/0000181 A1 | 1/2012 | Gerges | |

FOREIGN PATENT DOCUMENTS

DE 102007046891 4/2009

* cited by examiner

*Primary Examiner* — Kenneth Bomberg
*Assistant Examiner* — Dapinder Singh
(74) *Attorney, Agent, or Firm* — Baker Hostetler

(57) ABSTRACT

An engine exhaust aftertreatment component includes a housing defining an exhaust flow path from an exhaust inlet to an exhaust outlet. The housing supports an internal support channel. An aftertreatment brick module includes a catalytic brick, a can configured to receive the catalytic brick, and an end plate disposed along an end of the can. The end plate includes a coupling mechanism configured to be received within the internal support channel.

21 Claims, 4 Drawing Sheets ific examples, an engine system may
ENGINE EXHAUST AFTERTREATMENT COMPONENT INCLUDING AFTERTREATMENT BRICK MODULE

TECHNICAL FIELD

The present disclosure relates generally to an engine exhaust aftertreatment component, and more particularly to an engine exhaust aftertreatment component including an aftertreatment brick module having a coupling mechanism configured to be received within an internal support channel of the exhaust aftertreatment component housing.

BACKGROUND

Toxic emissions produced by internal combustion engines are the subject of environmental concern and have prompted increasingly stringent emissions regulations by the government. Toxic emissions produced by diesel engines, for example, include hydrocarbons, nitrogen oxides, carbon monoxide, and particulate matter. To reduce these toxic emissions and comply with governmental regulations, a number of engine exhaust aftertreatment components, including particulate filters and catalytic converters, have been developed. According to specific examples, an engine system may include a diesel particulate filter, a diesel oxidation catalyst, and a selective catalytic reduction component for treating the engine exhaust. These filters and components require periodic cleaning and/or replacement.

A serviceable exhaust aftertreatment assembly and method is described in U.S. Pat. No. 7,550,024 to Pawson et al. In particular, the Pawson et al. reference discloses an exhaust aftertreatment assembly housing including a plurality of aftertreatment components positioned in series along an exhaust flow path through the housing. The housing includes a side door or panel that may be laterally opened or removed to permit access to components within the housing. In particular, the Pawson et al. reference teaches the use of slip seal joints at axial ends of the aftertreatment component to be serviced. As a result, the aftertreatment component can be removed and replaced, without axially moving the aftertreatment components positioned upstream and/or downstream from the serviced component, while maintaining proper sealing between the components. While the servicing arrangement in Pawson et al. may be suitable for a particular exhaust aftertreatment assembly, it should be appreciated that there remains a continuing need to provide exhaust aftertreatment components and/or assemblies with improved serviceability such that filters or other components of the assemblies can be easily removed and replaced, but are secured from substantial movement when assembled.

The present disclosure is directed to one or more of the problems or issues set forth above.

SUMMARY OF THE DISCLOSURE

In one aspect, an engine exhaust aftertreatment component includes a housing defining an exhaust flow path from an exhaust inlet to an exhaust outlet. The housing supports an internal support channel. An aftertreatment brick module includes a catalytic brick, a can configured to receive the catalytic brick, and an end plate disposed along an end of the can. The end plate includes a coupling mechanism configured to be received within the internal support channel.

In another aspect, an aftertreatment brick module for an engine exhaust aftertreatment component includes a can defining a chamber extending from an open upstream end to an open downstream end, and a catalytic brick having an upstream face and a downstream face positioned within the chamber. An upstream end plate is disposed along the upstream end and includes an upstream opening therethrough corresponding to the upstream face. A downstream end plate is disposed along the downstream end and includes a downstream opening therethrough corresponding with the downstream face. Each of the upstream end plate and the downstream end plate includes a first coupling mechanism positioned along a first opposing side of a respective one of the upstream end plate and the downstream end plate, and a second coupling mechanism positioned along a second opposing side of the respective one of the upstream end plate and the downstream end plate. Each of the first and second coupling mechanisms of each of the upstream and downstream end plates is configured to be received within a separate one of a plurality of internal support channels of the engine exhaust aftertreatment component housing.

In another aspect, a method of treating exhaust from an internal combustion engine using an aftertreatment brick module is provided. The aftertreatment brick module includes a catalytic brick, a can configured to receive the catalytic brick, and an end plate, which includes a coupling mechanism, disposed along an end of the can. The method includes slidably moving the aftertreatment brick module into a housing of an engine exhaust aftertreatment component along a slide path by receiving the coupling mechanism within an internal support channel of the housing. Exhaust from an exhaust inlet, which is defined by the housing, is directed toward the aftertreatment brick module along an exhaust flow path, which is substantially transverse to the slide path. Exhaust from the aftertreatment brick module is directed toward an exhaust outlet, which is defined by the housing, along the exhaust flow path.

DETAILED DESCRIPTION

Reference will now be made in detail to specific embodiments or features, examples of which are illustrated in the accompanying drawings. Generally, corresponding or similar reference numbers will be used, when possible, throughout the drawings to refer to the same or corresponding parts.

Figure 1:
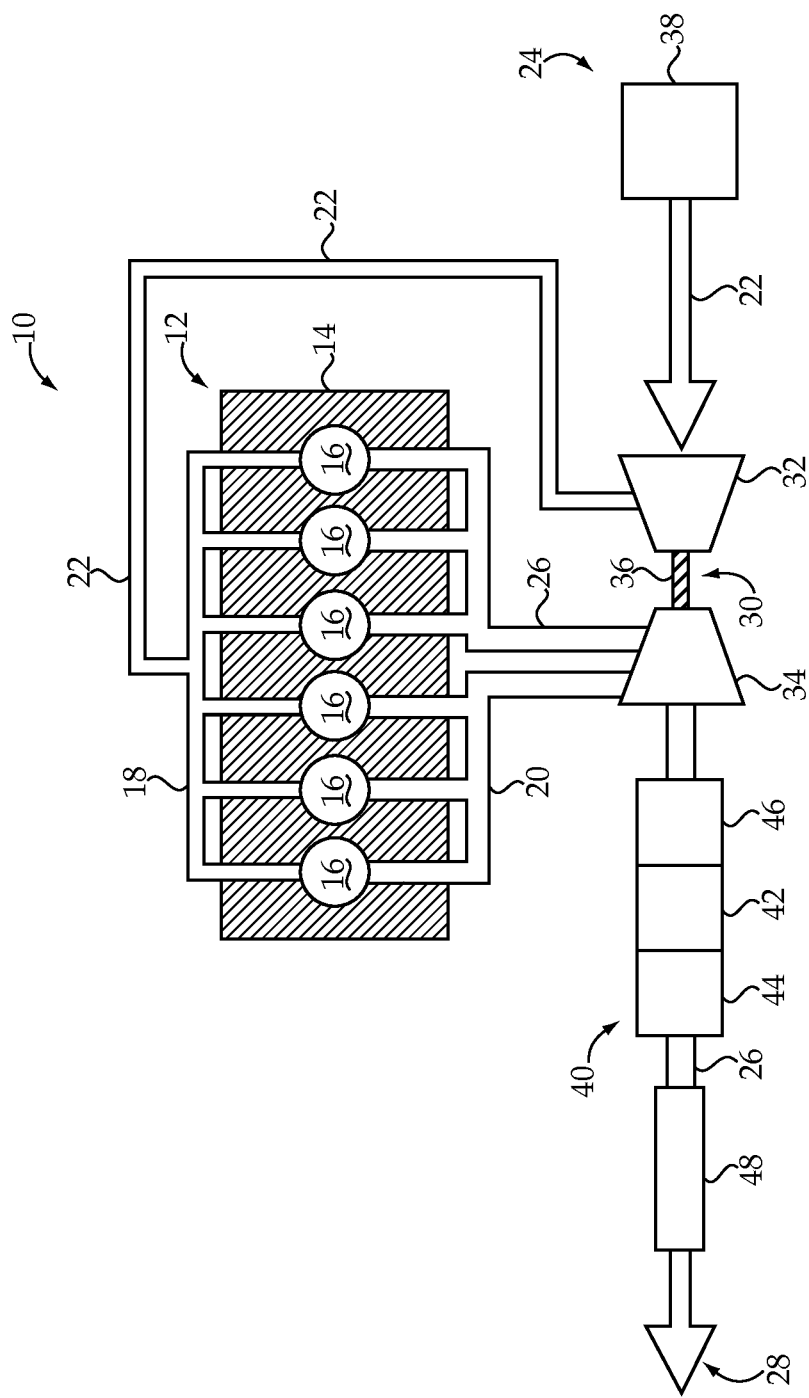
FIG. 1 illustrates a schematic of an engine system including a plurality of engine exhaust aftertreatment components, according to the present disclosure.

Referring to FIG. 1, there is shown a schematic view of an engine system 10, according to the present disclosure. The engine system 10 includes an internal combustion engine 12, which, for purposes of illustration, and not limitation, is that of a four-stroke, compression ignition engine and includes an engine block 14 defining a plurality of combustion chambers or cylinders 16. The internal combustion engine 12 may be any type of engine (e.g., internal combustion, gas, diesel, gaseous fuel, natural gas, propane, etc.), may be of any size, with any number of cylinders, any type of combustion chamber (e.g., cylindrical, rotary spark ignition, compression ignition, 4-stroke and 2-stroke, etc.), and in any configuration (e.g., "V," in-line, radial, etc.). The internal combustion engine 12 may also be used in a variety of applications, including, for example, land and marine applications. In the exemplary internal combustion engine 12, six combustion chambers 16 are shown, however, those skilled in the art will appreciate that any number of combustion chambers may be applicable.

The internal combustion engine 12 also includes an intake manifold 18 in communication with the combustion chambers 16 and capable of providing air to the internal combustion engine 12, and an exhaust manifold 20 also in communication with the combustion chambers 16 and capable of expending exhaust gas from the engine block 14. Generally speaking, the engine system 10 includes an intake air conduit 22, or passageway, extending from an air inlet 24 to the intake manifold 18, and an exhaust conduit 26, or passageway, extending from the exhaust manifold 20 to an exhaust outlet 28.

The engine system 10 may also include a turbocharger of standard design, shown generally at 30. Although one turbocharger is shown in the illustrated embodiment, it is known that more than one turbocharger, positioned in series or parallel, may be used in the engine system 10. The turbocharger 30 includes a compressor 32, disposed along the intake air conduit 22, connected to a turbine 34, disposed along the exhaust conduit 26, via a shaft 36. Exhaust gas leaving the exhaust manifold 20 passes through the exhaust conduit 26 and to a wheel of the turbine 34 to make it rotate. The rotation of the wheel turns the shaft 36, which, in turn, rotates a wheel of the compressor 32. The rotation of the compressor wheel pulls in ambient air through the intake air conduit 22 and compresses it. As should be appreciated, the ambient air may be filtered using one or more air filters 38.

The engine system 10 also includes an exhaust aftertreatment system 40 disposed along the exhaust conduit 26. According to the exemplary embodiment, the engine system 10 may include a plurality of engine exhaust aftertreatment components, which may be packaged together or separately, to define the exhaust aftertreatment system 40. For example, the aftertreatment system 40 may include a catalyst-based device 42, which may also be referred to as an engine exhaust aftertreatment component. The catalyst-based device 42 may include a catalyst configured to convert, such as via oxidation or reduction, one or more gaseous constituents of the exhaust gas produced by the internal combustion engine 12 to a more environmentally friendly gas and/or compound to be discharged into the atmosphere. For example, the catalyst may be configured to chemically alter at least one component of the exhaust flow. Catalyst-based device 42 may be configured for one or more various types of conversion, such as, for example, selective catalytic reduction (SCR), diesel oxidation (e.g., a diesel oxidation catalyst, DOC), and/or adsorption of nitrous oxides ($NO_x$; e.g., a $NO_x$ adsorber).

The aftertreatment system 40 may also include a particulate trap, such as, for example, a diesel particulate filter (DPF) 44, which may also be referenced as an engine exhaust aftertreatment component. The DPF 44 may include any type of aftertreatment device configured to remove one or more types of particulate matter, such as soot and/or ash, from an exhaust flow of the internal combustion engine 12. The DPF 44 may include a filter medium configured to trap the particulate matter as the exhaust gas flows through it. The filter medium may consist of a mesh-like material, a porous ceramic material (e.g., cordierite), or any other material and/or configuration suitable for trapping particulate matter. Regenerating means, such as well known active and/or passive regeneration means, may also be provided to periodically or continuously oxidize trapped particulate matter in the DPF 44. A regeneration system, which may also be generally referred to as an aftertreatment component, is shown generally at 46.

According to the exemplary embodiment, the engine system 10 may also include a muffler 48 for reducing the amount of noise emitted by the exhaust of the internal combustion engine 12. The muffler 48, as referenced herein, may also be referred to generally as an engine exhaust aftertreatment component. It should be appreciated that the engine system 10 may include any number and/or combination of engine exhaust aftertreatment components for treating or otherwise affecting the exhaust, and, further, any one or more engine exhaust aftertreatment components may be packaged together within a common module. Although the exemplary engine exhaust aftertreatment components (e.g., 42, 44, 46, and 48) are shown positioned downstream from the turbine 34 of the turbocharger 30, it should be appreciated that one or more aftertreatment components may be positioned upstream from the turbine 34.

Figure 2:
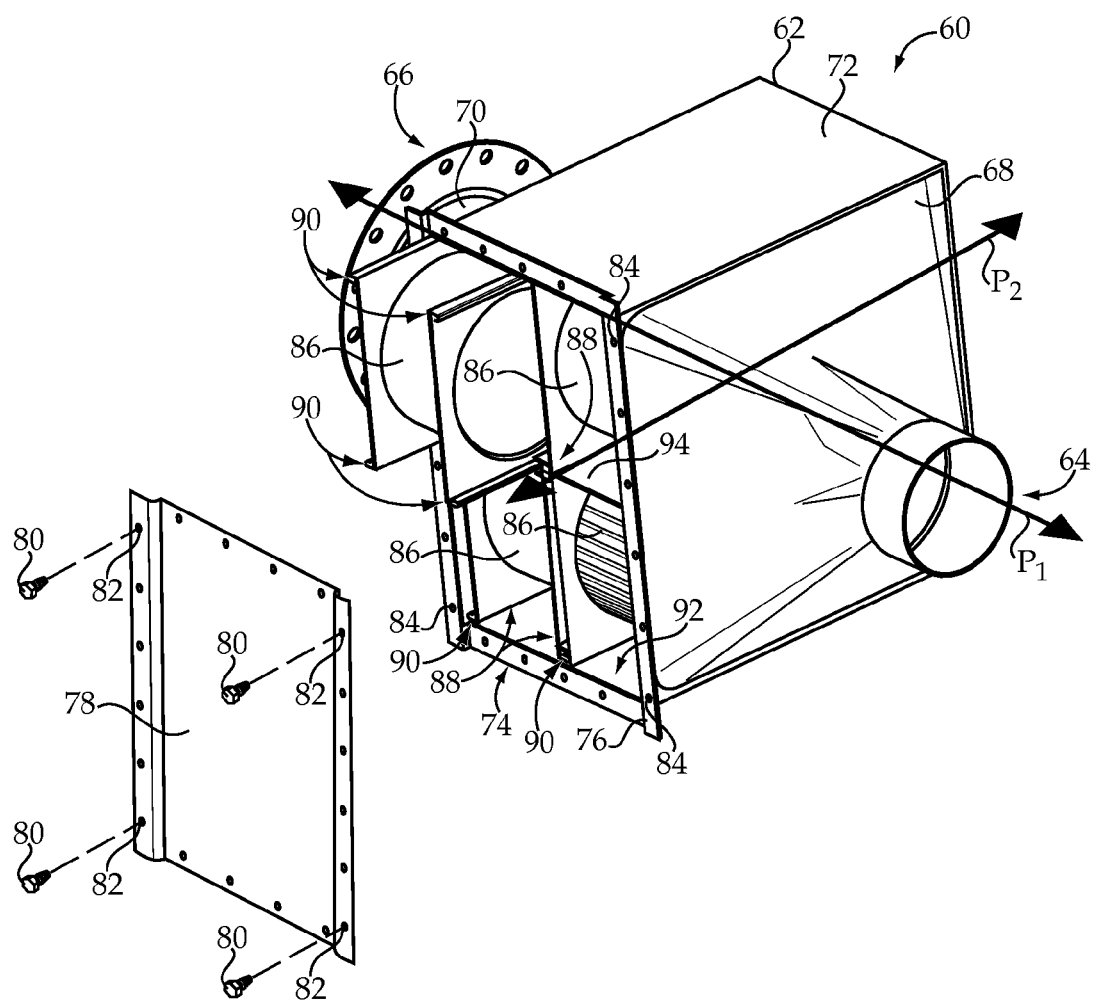
FIG. 2 illustrates an exemplary embodiment of an engine exhaust aftertreatment component configured for use with the engine system of FIG. 1, according to various aspects of the present disclosure.

Turning now to FIG. 2, an exemplary engine exhaust aftertreatment component 60 configured for use with the engine system 10 of FIG. 1 is shown. For example, the exemplary engine exhaust aftertreatment component 60 may be, or may include, a catalyst-based component similar to catalyst-based device 42 described above. The engine exhaust aftertreatment component 60 may include a housing 62 defining an exhaust flow path $P_1$ from an exhaust inlet 64 of the housing 62 to an exhaust outlet 66 of the housing 62. According to the exemplary embodiment, the housing 62 may include an upstream portion 68, a downstream portion 70, and a middle portion 72. The upstream portion 68 may be configured to fluidly connect with an upstream engine exhaust aftertreatment component, conduit, or other device positioned along the exhaust conduit 26. As shown, the upstream portion 68 may taper toward the exhaust inlet 64. The downstream portion 70 may be configured to fluidly connect with a downstream engine exhaust aftertreatment component, conduit, or other device positioned along the exhaust conduit 26. As shown, the downstream portion 70 may taper toward the exhaust outlet 66.

The housing 62 may include an access opening 74 through a side 76 of the housing 62. The access opening 74 may occupy a majority of the side 76, as shown, or may be an alternative size suitable for providing the access described herein. A removable side panel 78 may be removably positioned over the access opening 74. According to the exemplary embodiment, a plurality of fasteners 80, such as, for example, bolts, screws, clips, clamps, or the like, may be provided. The fasteners 80 may be positioned through corresponding openings 82 through the removable side panel 78 and openings 84 through the housing 62 to attach the removable side panel 78 at the side 76 of the housing 62 in a known manner. When the fasteners 80, or other fastening means, are loosened or removed, lateral access into the housing 62 is provided.

As shown, a plurality of aftertreatment brick modules 86, which will be discussed in greater detail below, may be received within the housing 62. Although a single aftertreatment brick module 86 may be used, some embodiments may include aftertreatment brick modules 86 positioned in parallel relative to the exhaust flow path $P_1$ and/or aftertreatment brick modules 86 positioned in series relative to the exhaust flow path $P_1$. The housing 62 includes a plurality of internal support channels 88, discussed in greater detail below, defining slide paths parallel with slide path $P_2$, which is substantially transverse to the exhaust flow path $P_1$. Each aftertreatment brick module 86 includes a plurality of coupling mechanisms 90 configured to be received within a respective one of the internal support channels 88. The internal support channels 88 may be provided along internal surfaces 92 of the housing 62, such as by welding or alternative attachment means. If multiple vertically spaced rows of aftertreatment brick modules 86 are used, it may be desirable to provide one or more support plates 94 within the housing 62 to support the desired internal support channels 88.

Figure 3:
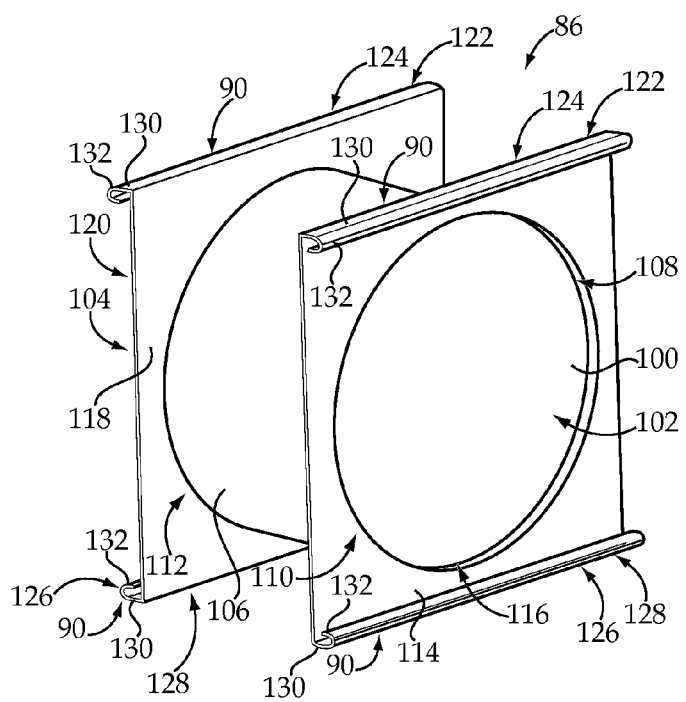
FIG. 3 illustrates an exemplary embodiment of an aftertreatment brick module for use with the engine exhaust aftertreatment component of FIG. 2.

Referring to FIG. 3, the exemplary aftertreatment brick module 86 generally includes a catalytic brick 100 having an upstream face 102 and a downstream face 104, and a can 106 defining a chamber 108 extending from an open upstream end 110 to an open downstream end 112. It should be appreciated that the "upstream face" 102 and "upstream end" 110 may face, or be positioned adjacent to, the exhaust inlet 64, while the "downstream face" 104 and "downstream end" 112 may face, or be positioned closest to, the exhaust outlet 66. The catalytic brick 100 and can 106 may both have a cylindrical shape, as shown, and the catalytic brick 100 may, for example, be configured for selective catalytic reduction, as described above. The aftertreatment brick module 86 may also include an upstream end plate 114 disposed along the open upstream end 110 and including an upstream opening 116 therethrough corresponding to the upstream face 102, and a downstream end plate 118 disposed along the open downstream end 112 and including a downstream opening 120 therethrough corresponding with the downstream face 104. Each of the upstream and downstream faces 102 and 104 and the upstream and downstream end plates 114 and 118 may extend in a direction substantially perpendicular relative to the exhaust flow path $P_1$.

Figure 4:
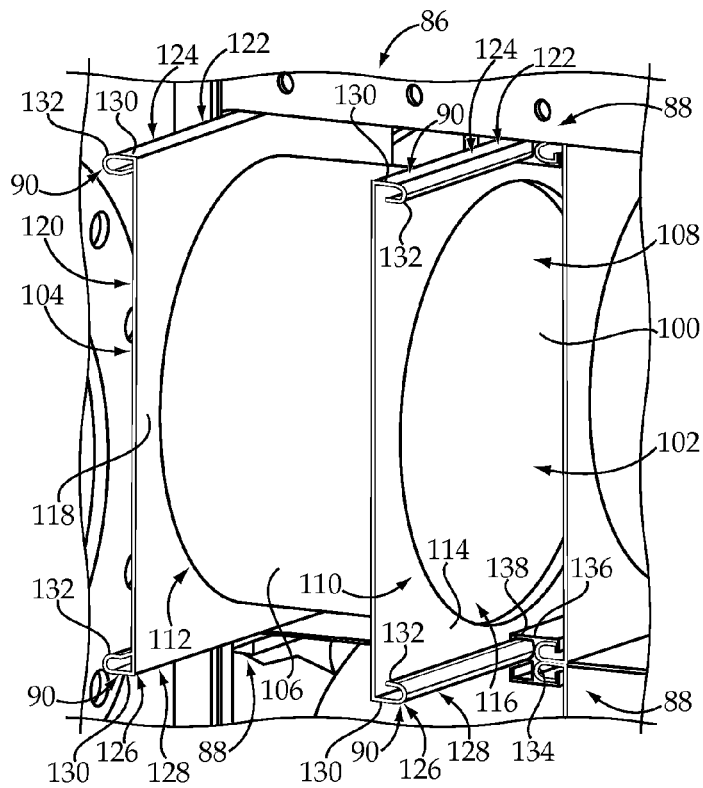
FIG. 4 illustrates the coupling mechanism of the aftertreatment brick module of FIG. 3 received within an exemplary internal support channel of the housing of FIG. 2.

Each of the upstream end plate 114 and the downstream end plate 118 includes a first coupling mechanism 122 positioned along a first opposing side 124 of a respective one of the upstream end plate 114 and the downstream end plate 118, and a second coupling mechanism 126 positioned along a second opposing side 128 of the respective one of the upstream end plate 114 and the downstream end plate 118. Each of the first coupling mechanism 122 and the second coupling mechanism 126 of each of the upstream end plate 114 and the downstream end plate 118 is configured to be received within a separate one of the plurality of internal support channels 88, as shown in FIG. 4. In particular, each of the first coupling mechanism 122 and the second coupling mechanism 126 of each of the upstream end plate 114 and the downstream end plate 118 includes an outwardly extending flange 130, with the outwardly extending flange 130 terminating in a curved edge 132.

Referring to FIGS. 3 and 4, the coupling mechanisms 122 and 126 of the upstream and downstream end plates 114 and 118 may each be configured as a J-shaped edge extending substantially perpendicularly from a respective one of the upstream and downstream end plates 114 and 118 and substantially parallel to the exhaust flow path $P_1$. Further, the internal support channels 88 may be substantially L-shaped and may include a first leg 134 extending from the housing 62 in a direction substantially perpendicular to both the exhaust flow path $P_1$ and the slide path $P_2$, a second leg 136 extending from the first leg 134 in a direction substantially parallel to the exhaust flow path $P_1$, and a third leg 138 extending from the second leg 136 in a direction substantially parallel to the first leg 134. The internal support channels 88 may be configured and arranged to receive the J-shaped edge of the coupling mechanisms 122 and 126 in the interlocked manner illustrated in FIG. 4. When the internal support channels 88 receive the coupling mechanisms 122 and 126, the aftertreatment brick modules 99 are restricted from moving in a direction corresponding to the exhaust flow path $P_1$, but are permitted to be slidably inserted and/or removed from the housing 62 in a direction corresponding to the slide path $P_2$, such as, for example, via the access opening 74.

Figure 5:
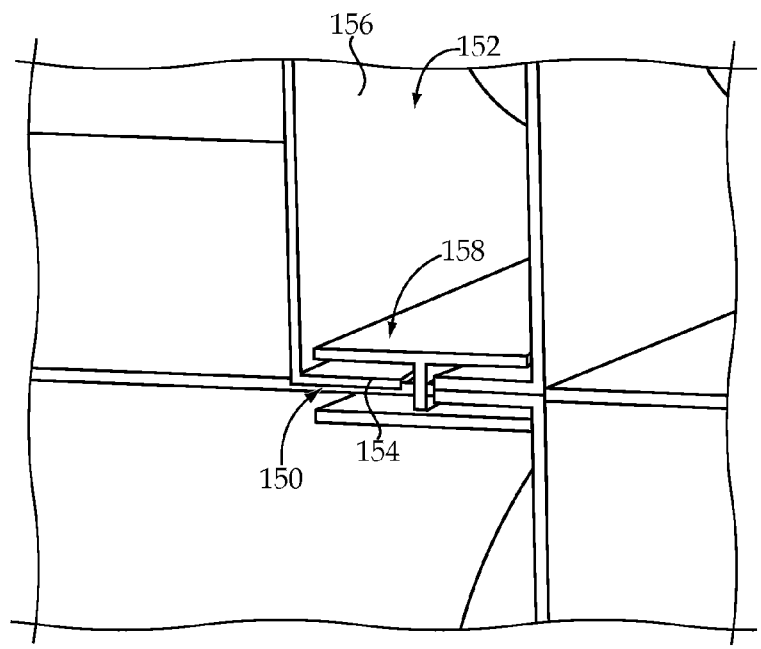
FIG. 5 illustrates an alternative coupling mechanism for an aftertreatment brick module and an alternative internal support channel, according to the present disclosure.
Figure 6:
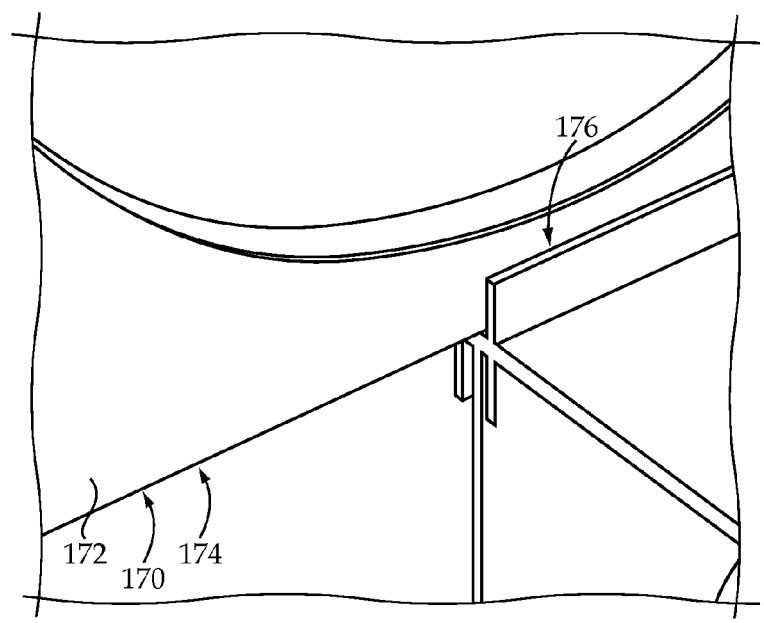
FIG. 6 illustrates another alternative coupling mechanism for an aftertreatment brick module and another alternative internal support channel, according to the present disclosure.

According to an alternative embodiment, and as shown in FIG. 5, a coupling mechanism 150 for an aftertreatment brick module 152 may be configured as a tabbed edge 154 extending substantially perpendicularly from an end plate 156 and substantially parallel to the exhaust flow path $P_1$. A corresponding internal support channel 158 may be a linear channel extending substantially parallel to the exhaust flow path $P_1$ and being configured and arranged to receive the tabbed edge 154 of the coupling mechanism 150 in the interlocked manner illustrated in FIG. 5. According to another alternative embodiment, and as shown in FIG. 6, a coupling mechanism 170 of an end plate 172 may be configured as a straight edge 174 extending substantially linearly from the end plate 172 and substantially perpendicular to the exhaust flow path $P_1$. A corresponding internal support channel 176 may be a linear channel extending substantially perpendicular to the exhaust flow path $P_1$ and being configured and arranged to receive the straight edge 174 of the coupling mechanism 170 in the interlocked manner illustrated in FIG. 6. Various additional alternative coupling means are also contemplated.

INDUSTRIAL APPLICABILITY

The present disclosure may be applicable to engine systems having an exhaust aftertreatment system. Further, the present disclosure may be applicable to engine exhaust aftertreatment systems having one or more engine exhaust aftertreatment components. Yet further, the present disclosure may be applicable exhaust aftertreatment component arrangements offering improved serviceability.

Referring generally to FIGS. 1-6, an engine system 10 may include an internal combustion engine 12 having an engine block 14 defining a plurality of combustion chambers or cylinders 16. An intake system may generally include an intake air conduit 22 extending from an air inlet 24 to an intake manifold 18, with an air filter 38 and compressor 32 of a turbocharger 30 disposed along the conduit 22. The engine system 10 may be configured to route exhaust gases produced by the internal combustion engine 12 away from the engine 12 via the exhaust conduit 26, which may be configured to direct the exhaust flow from the internal combustion engine 12 through the turbine 34 of the turbocharger 30, through aftertreatment system 40, and ultimately release the exhaust flow to the atmosphere through the exhaust outlet 28. The aftertreatment system 40 may, for example, include a catalyst-based device 42, a diesel particulate filter (DPF) 44, muffler 48, and a regeneration system 46.

An exemplary embodiment of an engine exhaust aftertreatment component 60, which may, for example, represent catalyst-based device 42, is shown generally in FIG. 2. The engine exhaust aftertreatment component 60 may include a housing 62, which includes a plurality of internal support channels 88. The housing 62 may also include an access opening 74 through a side 76 of the housing 62, with a removable side panel 78 positioned over the access opening 74. With the removable side panel 78 removed, or otherwise repositioned to expose the access opening 74, one or more aftertreatment brick modules 86 may be received within the housing 62. In some aspects, the housing 62 may receive eight aftertreatment brick modules 86 that are arranged such that a first set of four aftertreatment brick modules 86 are disposed in parallel with one another relative to exhaust flow through the housing 62, and a second set of four aftertreatment brick modules 86 are disposed in parallel with one another relative to exhaust flow through the housing 62. The second set of four aftertreatment brick modules 86 may be disposed in series with the first set of four aftertreatment brick modules 86 relative to exhaust flow through the housing 62.

The aftertreatment brick module 86 generally includes a catalytic brick 100 having an upstream face 102 and a downstream face 104, and a can 106 defining a chamber 108 extending from an open upstream end 110 to an open downstream end 112. The aftertreatment brick module 86 may also include an upstream end plate 114 disposed along the open upstream end 110 and a downstream end plate 118 disposed along the open downstream end 112. Each of the upstream end plate 114 and the downstream end plate 118 may include a first coupling mechanism 122 positioned along a first opposing side 124 of a respective one of the upstream end plate 114 and the downstream end plate 118, and a second coupling mechanism 126 positioned along a second opposing side 128 of the respective one of the upstream end plate 114 and the downstream end plate 118. Each of the first coupling mechanism 122 and the second coupling mechanism 126 of each of the upstream end plate 114 and the downstream end plate 118 is configured to be received within a separate one of the plurality of internal support channels 88.

In particular, the aftertreatment brick modules 86 may be slidably moved into the housing 62 through the access opening 74 by receiving the first and second coupling mechanisms 122 and 126 of the upstream and downstream end plates 114 and 118 within a respective internal support channel 88. The first and second coupling mechanisms 122 and 126 and the internal support channels 88 may have alternative configurations, as shown in FIGS. 5 and 6. Preferably, the coupling mechanisms 122 and 126 and internal support channels 88 have complementary shapes that provide suitable interlocking engagement. Once the aftertreatment brick modules 86 are properly positioned within the housing 62, the removable side panel 78 may be reattached or otherwise positioned to effectively close the housing 62.

The housing 62 is configured to fluidly connect the engine exhaust aftertreatment component 60 along the exhaust conduit 26. Thus, with the removable side panel 78 properly positioned, the housing 62 defines an exhaust flow path $P_1$ from an exhaust inlet 64 of the housing 62 to an exhaust outlet 66 of the housing 62. As such, the engine exhaust aftertreatment component 60 may be positioned and configured to receive exhaust gas from the internal combustion engine 12, treat the exhaust gas using the aftertreatment brick modules 86, and direct the exhaust toward the exhaust outlet 28.

The engine exhaust aftertreatment component 60 described herein, including the aftertreatment brick modules 86 having coupling mechanisms 122 and 126 configured to slidably engage internal support channels 88 of a housing 62 of the engine exhaust aftertreatment component 60, provides an engine system component having improved serviceability. In particular, the aftertreatment brick modules 86 may be initially installed and thereafter serviced or replaced as described herein in a more expedient manner as compared to conventional designs. In addition, the arrangement provided herein does not utilize numerous straps, fasteners, or the like that are conventionally used to secure catalytic bricks and are undesirably positioned within the exhaust flow, subjecting them to damage and/or failure. Further, the disclosed arrangement provides improved serviceability such that the aftertreatment brick modules 86 can be easily removed and replaced, but are secured from substantial movement when assembled.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An engine exhaust aftertreatment component, comprising:
   a housing defining an exhaust flow path from an exhaust inlet to an exhaust outlet, the housing including an internal support defining a slide path that is substantially transverse to the exhaust flow path therein; and
   an aftertreatment brick module including a catalytic brick, a can configured to receive the catalytic brick, and an end plate disposed along an end of the can, wherein the end plate includes an integral coupling mechanism configured to be received by the internal support such that the aftertreatment brick module may be slid into the housing and supported therein by the internal support.

2. The engine exhaust aftertreatment component of claim 1, further including an access opening through a side of the housing and a removable side panel positioned over the access opening, wherein the side lies in a plane substantially perpendicular to the slide path.

3. The engine exhaust aftertreatment component of claim 1, wherein at least two aftertreatment brick modules are disposed within the housing and positioned in parallel relative to the exhaust flow path.

4. The engine exhaust aftertreatment component of claim 1, wherein at least two aftertreatment brick modules are disposed within the housing and positioned in series relative to the exhaust flow path.

5. The engine exhaust aftertreatment component of claim 1, wherein the catalytic brick and the can each have a cylindrical shape.

6. The engine exhaust aftertreatment component of claim 1, wherein the catalytic brick is configured for selective catalytic reduction.

7. The engine exhaust aftertreatment component of claim 1 wherein the internal support comprises at least a first leg extending from the housing in a direction substantially perpendicular to the exhaust flow path, a second leg extending from the first leg in a direction substantially parallel to the exhaust flow path, and a third leg extending from the second leg in a direction substantially parallel to the first leg.

8. The engine exhaust aftertreatment component of claim 1 wherein the internal support comprises at least one linear channel extending substantially parallel to the exhaust flow path that is configured to receive the end plate coupling mechanism.

9. The engine exhaust aftertreatment component of claim 8 wherein the coupling mechanism is an edge of the end plate.

10. The engine exhaust aftertreatment component of claim 1, wherein the aftertreatment brick module includes an upstream end plate disposed along an upstream end of the can and a downstream end plate disposed along a downstream end of the can, wherein the upstream end plate includes an upstream opening through the upstream end plate corresponding to an upstream face of the catalytic brick and the downstream end plate includes a downstream opening through the downstream end plate corresponding to a downstream face of the catalytic brick.

11. The engine exhaust aftertreatment component of claim 10, wherein each of the upstream end plate and the downstream end plate includes a first coupling mechanism positioned along a first opposing side of a respective one of the upstream end plate and the downstream end plate, and a second coupling mechanism positioned along a second opposing side of the respective one of the upstream end plate and the downstream end plate.

12. The engine exhaust aftertreatment component of claim 11, wherein each of the first coupling mechanism and the second coupling mechanism includes an outwardly extending flange.

13. The engine exhaust aftertreatment component of claim 12, wherein the outwardly extending flange terminates in a curved edge.

14. An aftertreatment brick module for an engine exhaust aftertreatment component, the engine exhaust aftertreatment component including a housing defining an exhaust flow path from an exhaust inlet to an exhaust outlet, wherein the housing supports an internal support, the aftertreatment brick module comprising:
    a catalytic brick having an upstream face and a downstream face;
    a can defining a chamber extending from an open upstream end to an open downstream end, wherein the catalytic brick is positioned within the chamber;
    an upstream end plate disposed along the upstream end and including an upstream opening therethrough corresponding to the upstream face; and
    a downstream end plate disposed along the downstream end and including a downstream opening therethrough corresponding with the downstream face;
    wherein each of the upstream end plate and the downstream end plate includes a first intergral coupling mechanism positioned along a first opposing side of a respective one of the upstream end plate and the downstream end plate, and a second integral coupling mechanism positioned along a second opposing side of the respective one of the upstream end plate and the downstream end plate;
    wherein each of the first coupling mechanism and the second coupling mechanism of each of the upstream end plate and the downstream end plate is configured to be received and supported by the internal support.

15. The aftertreatment brick module of claim 14, wherein the catalytic brick and the can each have a cylindrical shape.

16. The aftertreatment brick module of claim 14, wherein the catalytic brick is configured for selective catalytic reduction.

17. The aftertreatment brick module of claim 14, wherein each of the first coupling mechanism and the second coupling mechanism of each of the upstream end plate and the downstream end plate includes an outwardly extending flange.

18. The aftertreatment brick module of claim 17, wherein the outwardly extending flange terminates in a curved edge.

19. A method of treating exhaust from an internal combustion engine using an aftertreatment brick module, the aftertreatment brick module including a catalytic brick, a can configured to receive the catalytic brick, and an end plate disposed along an end of the can, wherein the end plate includes an integral coupling mechanism, the method comprising:
    slidably moving the aftertreatment brick module into a housing of an engine exhaust aftertreatment component along a slide path by receiving the coupling mechanism by an internal support of the housing;
    directing exhaust from an exhaust inlet defined by the housing toward the aftertreatment brick module along an exhaust flow path; and
    directing exhaust from the aftertreatment brick module toward an exhaust outlet defined by the housing along the exhaust flow path, wherein the exhaust flow path is substantially transverse to the slide path.

20. The method of claim 19, further including slidably moving the aftertreatment brick module through an access opening through a side of the housing, wherein the side lies in a plane substantially perpendicular to the slide path.

21. The method of claim 19, further including positioning a plurality of aftertreatment brick modules within the housing.

* * * * *